(12) United States Patent
Breitfeld et al.

(10) Patent No.: US 10,138,933 B2
(45) Date of Patent: Nov. 27, 2018

(54) DEVICE FOR ADJUSTING THE BEARING PLAY OF COMPONENTS THAT ARE MOUNTED SUCH THAT THEY CAN ROTATE COAXIALLY IN RELATION TO ONE ANOTHER, AND ASSEMBLY OF COMPONENTS THAT ARE MOUNTED SUCH THAT THEY CAN ROTATE COAXIALLY IN RELATION TO ONE ANOTHER

(71) Applicant: HWG Horst Weidner GmbH, Renningen (DE)

(72) Inventors: Sven Breitfeld, Magstadt (DE); Frank Weidner, Gerlingen (DE)

(73) Assignee: HGW Horst Weidner GmbH, Renningen (DE)

( * ) Notice: Subject to any disclaimer, the term of this patent is extended or adjusted under 35 U.S.C. 154(b) by 0 days.

(21) Appl. No.: 15/506,408

(22) PCT Filed: Aug. 21, 2015

(86) PCT No.: PCT/DE2015/000418
§ 371 (c)(1),
(2) Date: Feb. 24, 2017

(87) PCT Pub. No.: WO2016/029896
PCT Pub. Date: Mar. 3, 2016

(65) Prior Publication Data
US 2017/0254361 A1    Sep. 7, 2017

(30) Foreign Application Priority Data
Aug. 26, 2014    (DE) ........................ 10 2014 012 409

(51) Int. Cl.
*F16C 25/06*    (2006.01)
*F16C 19/08*    (2006.01)
(Continued)

(52) U.S. Cl.
CPC .............. *F16C 25/06* (2013.01); *B62K 19/34* (2013.01); *B62K 25/02* (2013.01); *B62M 3/003* (2013.01);
(Continued)

(58) Field of Classification Search
CPC ..... F16C 25/06; F16C 2326/26; B62M 3/003; B62K 19/34; B62K 25/02
(Continued)

(56) References Cited

U.S. PATENT DOCUMENTS

| 1,226,782 | A | 5/1917 | Lemieux |
| 2,886,382 | A | 5/1959 | Baublys |

(Continued)

FOREIGN PATENT DOCUMENTS

| DE | 589 232 A | 3/1940 |
| DE | 1 069 954 B | 11/1959 |

(Continued)

OTHER PUBLICATIONS

International Search Report of PCT/DE2015/000418, dated Nov. 30, 2015.

*Primary Examiner* — James Pilkington
(74) *Attorney, Agent, or Firm* — Collard & Roe, P.C.

(57) ABSTRACT

A device for adjusting the bearing play of components mounted coaxially rotatable to one another and rotatably joined to one another via two axially separated roller bearings is operatively connected to one roller bearing by an end side and to a counter bearing by the opposing end side. The device is formed by two coaxially adjacent rings on one of the components. Each opposing end surface thereof has at least one contour projecting from the plane of the end surfaces. At least one contour has an incline on which the at least one opposing contour slides. One ring is operatively connected to the counter bearing by the other end surface.

(Continued)

Figure 1:
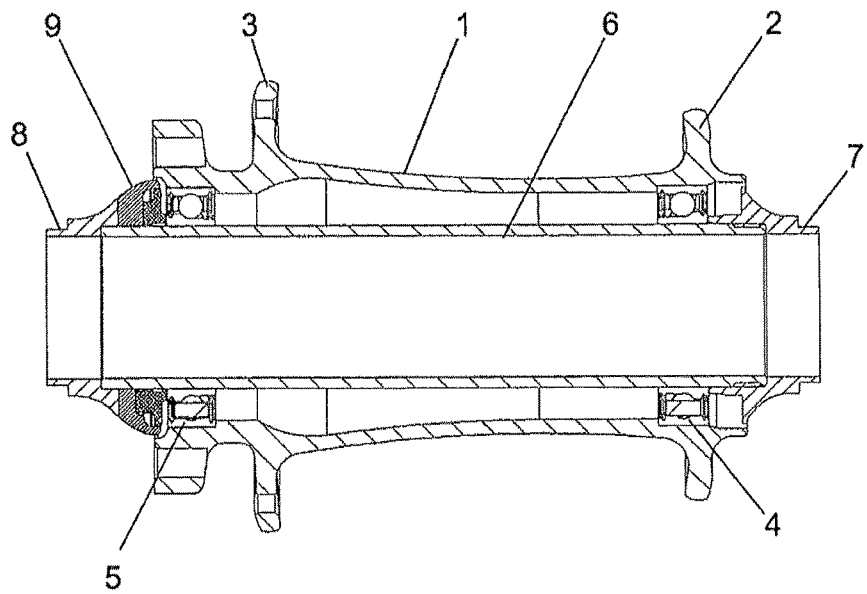

The other ring is operatively connected to the roller bearing. A device for mutual radial rotation and a device for locking the axially moving ring in the assumed axial position are on both rings.

9 Claims, 5 Drawing Sheets

(51) Int. Cl.
*B62M 3/00* (2006.01)
*B62K 25/02* (2006.01)
*B62K 19/34* (2006.01)
*F16C 29/12* (2006.01)

(52) U.S. Cl.
CPC ............ *F16C 19/08* (2013.01); *F16C 29/126* (2013.01); *F16C 2326/26* (2013.01)

(58) Field of Classification Search
USPC .................. 74/568 R; 384/517, 519, 563
See application file for complete search history.

(56) References Cited

U.S. PATENT DOCUMENTS

| | | | | |
|---|---|---|---|---|
| 5,284,383 A | * | 2/1994 | Lehanneur | B62K 25/00 301/110.5 |
| 5,454,281 A | * | 10/1995 | Chi | B62K 19/32 280/279 |
| 8,087,685 B2 | | 1/2012 | Weidner | |
| 8,662,517 B2 | * | 3/2014 | King | F16C 19/16 280/270 |

FOREIGN PATENT DOCUMENTS

| | | |
|---|---|---|
| DE | 36 42 463 A1 | 6/1988 |
| DE | 199 40 969 A1 | 11/2000 |
| DE | 10 2005 022 808 A1 | 11/2006 |
| EP | 0 513 697 A2 | 11/1992 |
| FR | 1 173 771 A | 3/1959 |
| GB | 320 732 A | 10/1929 |

* cited by examiner

DEVICE FOR ADJUSTING THE BEARING PLAY OF COMPONENTS THAT ARE MOUNTED SUCH THAT THEY CAN ROTATE COAXIALLY IN RELATION TO ONE ANOTHER, AND ASSEMBLY OF COMPONENTS THAT ARE MOUNTED SUCH THAT THEY CAN ROTATE COAXIALLY IN RELATION TO ONE ANOTHER

CROSS REFERENCE TO RELATED APPLICATIONS

This application is the National Stage of PCT/DE2015/000418 filed on Aug. 21, 2015, which claims priority under 35 U.S.C. § 119 of German Application No. 10 2014 012 409.6 filed on Aug. 26, 2014, the disclosures of which are incorporated by reference. The international application under PCT article 21 (2) was not published in English.

STATE OF THE ART

The invention proceeds from an apparatus for adjustment of the bearing play of components mounted so as to rotate coaxially relative to one another, for example axles in wheel hubs or shafts in housings, as well as from an assembly of components mounted so as to rotate coaxially relative to one another.

Apparatuses for adjustment of bearing plays have been state of the art for a long time. This generally involves individual positioning over the preload path. The desired preload force can be adjusted using adjusting washers, intermediate rings or spacer rings having specific tolerances. This play adjustment is relatively complicated, because the bearing play must be measured in advance for a selection of the suitable adjusting washers or rings. Without measuring the bearing play, only trial and error with different adjusting washers or rings is possible, but this can be very time-consuming, under some circumstances, because for replacement of the adjusting washers or rings, the component along with its bearing must be taken out of the holder or the housing in which it is mounted.

Generation of the positioning force in direct manner, for example by way of a countered adjusting nut or a countered cone, is also known. In this regard, the adjusting nut is pressed against the fixed ring of the roller bearing, or the cone is pressed against the roller bodies, and these are locked in position using a counter-nut. Two tools are always required for this purpose. Furthermore, when tightening the counter-nut, the adjusting nut or the cone can be minimally rotated out of its set position again, thereby changing the play once again, so that re-adjustment becomes necessary. It is also disadvantageous that first, the bearing play always has to be adjusted, before the component are attached in the housing, the rack, the fork or the frame. Vice versa, loosening of the attachment of the components is always required before the play can be changed.

The invention is therefore based on the task of developing an apparatus for adjustment of the bearing play of components mounted so as to rotate coaxially relative to one another, in which the force for play adjustment in the installed state of the components can be applied and adjusted in simple manner.

The Invention and its Advantages

The apparatus for adjustment of the axial bearing play of components mounted so as to rotate coaxially within one another, having the characterizing features according to the invention, has the advantage, as compared with the state of the art described, that it allows application and adjustment of the force to be applied for reduction of the bearing play, all the way to application of a preload to the bearings, in simple manner, and also reliably maintains an axial force once it has been adjusted. Operation of the apparatus is possible in simple manner, using a single tool. It is particularly advantageous that the apparatus can be integrated into a completely pre-assembled assembly, consisting of the components mounted so as to rotate coaxially within one another, along with their accommodation, for example a housing, a rack, a vehicle fork or a vehicle frame, so that the play adjustment is possible not only in a pre-assembled state but also when all the components are arranged so as to be ready to function, i.e. ready for use or ready to travel.

This is achieved in that the apparatus consists of two rings that are disposed coaxially next to one another, which rings can still be rotated relative to one another if both rings, with their outer face surfaces, stands in interaction with the counter-bearing formed by the housing, the rack, the frame or the fork, and the face surface of the other ring stands in interaction with a part of the roller bearing. The face surfaces of the two rings, which face one another, have a contour that projects out of the plane of these face surfaces, wherein at least one of the contours is provided with an incline on which the at least one opposite contour slides when the one ring is rotated relative to the other ring. The two rings have suitable means for rotation of both rings relative to one another. The ring that stands in interaction with the roller bearing acts on the fixed component of the roller bearing, in each instance. For reciprocal radial rotation of the two rings, the means required for this are selected in such a manner that the one ring has a counter-bearing and the other ring has an adjustment mechanism. A stop element that projects axially out of the face surface of the one ring serves as a counter-bearing. Accordingly, the opposite ring is provided with the adjustment mechanism. For this purpose, the latter ring mentioned has a recess into which the stop element of the first ring mentioned projects. The recess is widened in the circumference direction of the ring, and an adjustment element projects into this recess essentially over a range of tangentially to at a slight slant, which element can be moved and locked against the stop element of the first ring mentioned.

The invention can be used to particular advantage for play adjustment of the bearings of bicycle hubs. The play adjustment takes place on the wheels that have already been installed on the fork or the frame and tightened. Here, the advantage that the apparatus is very small, compact, and light also comes to bear, because it is disposed on the axle between a shank of the fork or of the frame and an outer roller bearing, and does not project beyond the spoke flange in diameter.

However, the invention can also be advantageously used for adjustment of bearing play on rotating shafts, particularly spindles of machine tools.

The adjustment apparatus of the bearing play can be positioned at any desired location between the counter-bearing and one of the two roller bearings. In this way, a certain freedom of design exists in the structure of the bearing or in the layout of the complete assembly. It is advantageous if the adjustment apparatus is placed at a location that is easily accessible in the installed assembly.

In an advantageous embodiment of the invention, the ring that stands in interaction with the roller bearing has the stop element that projects axially out of the face surface of the ring. Accordingly, the opposite ring that stands in interaction with the counter-bearing is provided with the adjustment mechanism. For this purpose, the last ring mentioned has the recess into which the stop element of the ring that stands in interaction with the roller bearing projects. The recess is widened in the circumference direction of the ring, and the adjustment element projects into this recess essentially over a range of tangentially to at a slight slant, which element can be moved and locked against the stop element of the first ring mentioned. As a result, the ring equipped with the adjustment mechanism stands farther away from the roller bearing, so that it is more easily accessible to a tool for adjustment of the bearing play.

According to an advantageous embodiment of the invention in this regard, the stop element is a pin and the adjustment element is an adjustment screw, thereby achieving a space-saving and compact method of construction.

According to a different advantageous embodiment of the invention, the ring that accommodates the adjustment element consists of a polymer material. In this way, the adjustment apparatus can be produced in cost-advantageous manner, particularly by means of injection-molding. An adjustment screw produced from a polymer material can be configured with a self-locking thread in simple manner, thereby making additional securing of the adjustment screw unnecessary.

According to an additional advantageous embodiment of the invention, the ring that stands in interaction with the roller bearing has an inner seal on the inner circumference of its face surface that lies against the roller bearing and an outer seal on the outer circumference of this face surface. In this way, this ring simultaneously acts as a primary seal for the roller bearing, wherein the inner seal lies against the inner ring and the outer seal lies against the outer ring of the roller bearing and, in total, a very good bearing seal is guaranteed. In this regard, the seals can be laid into the ring or injection-molded on. When using polymer materials for the ring, it is particularly advantageous, in terms of production technology, if the seal is injection-molded on.

According to a particularly advantageous embodiment of the invention, the ring that stands in interaction with the roller bearing acts on a conical inner ring of the roller bearing by way of an axially displaceable cone. In this way, the static axial preload force as well as the dynamically occurring operational forces act, to a very great extent, not in the axial direction but rather in the radial direction. How great the proportion of the remaining axial stress is depends on the angles of the cones that act on one another. Starting from a specific angle ratio, which depends on the static friction coefficient of the two friction partners, the effect of self-locking occurs, and thereby no more axial force component at all acts on the pressure ring, in spite of an axial stress of the inner ring. This represents an advantage in that the bearing play adjustment apparatus, depending on the embodiment and the operational forces that occur, can be stressed only with a specific amount of axial pressure. If therefore, depending on the design, no or only very slight operational forces act on the bearing play adjustment apparatus, the apparatus can also be dimensioned to be smaller, in total. This embodiment is particularly advantageous if the pressure ring is produced from plastic.

In a different advantageous embodiment of the invention, the ring that stands in interaction with the roller bearing lies directly against the balls of the roller bearing. For this purpose, the face side of the ring that faces the roller bearing has a running groove for the balls of the roller bearing. This embodiment offers particularly simple and therefore cost-advantageous bearing play adjustment for roller bearings that do not have an inner ring.

Further advantages and advantageous embodiments of the invention can be derived from the following description, the claims, and the drawings.

DRAWING

Figure 2:
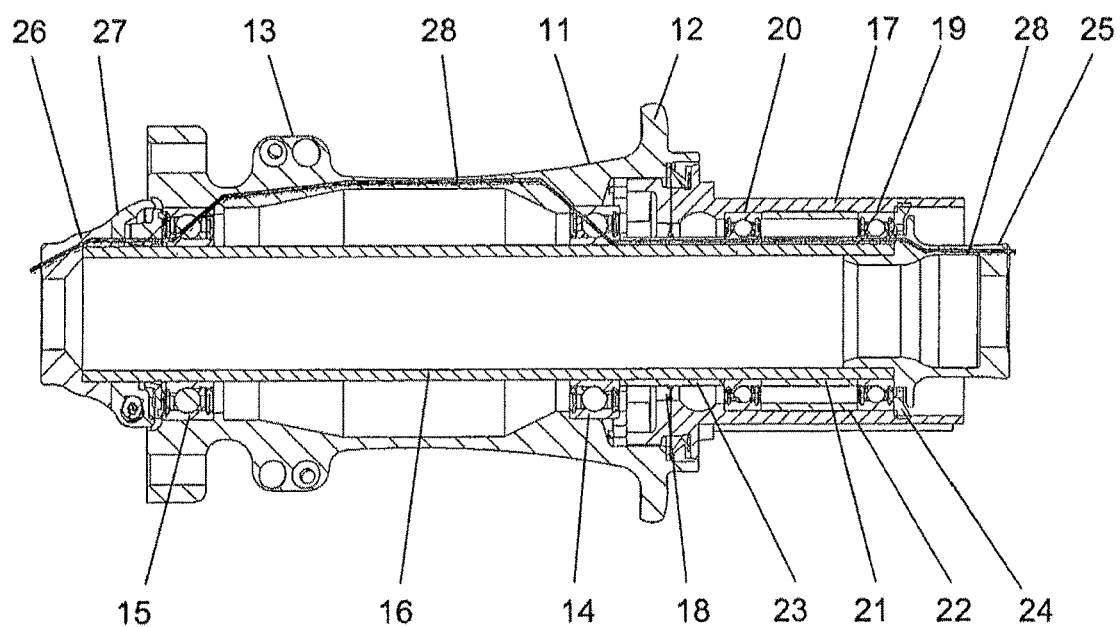
Figure 3:
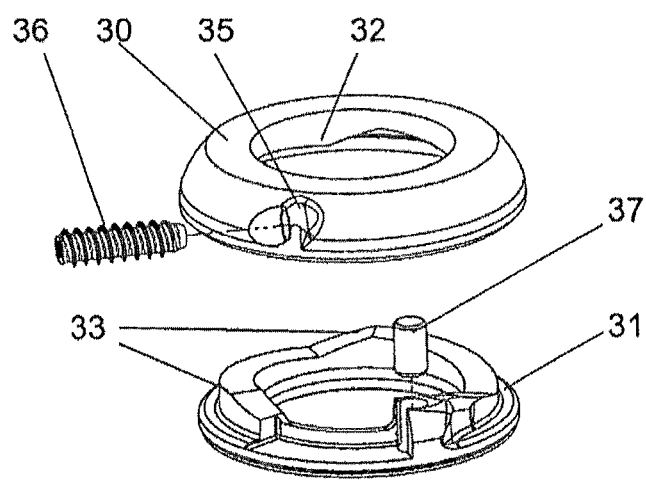
Figure 4:
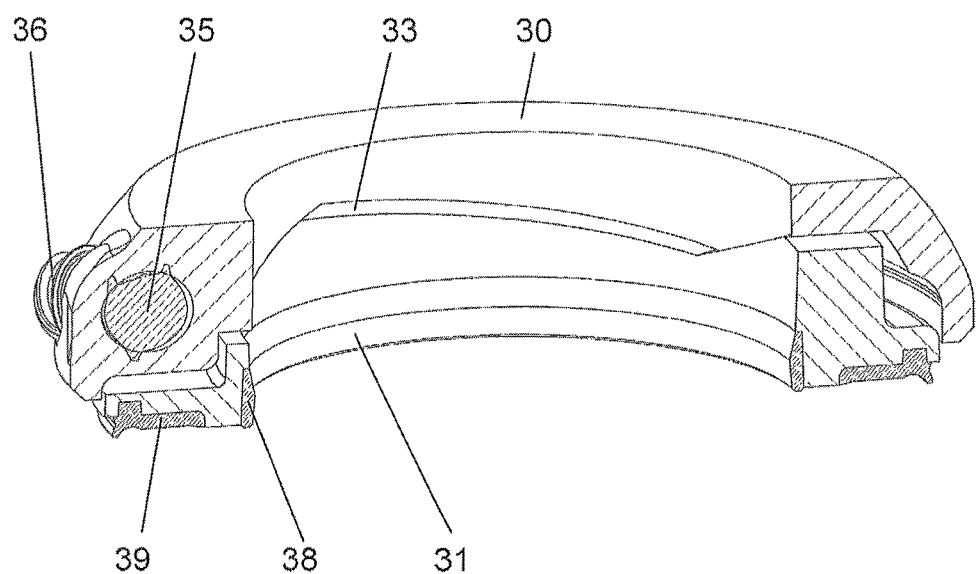
Figure 5:
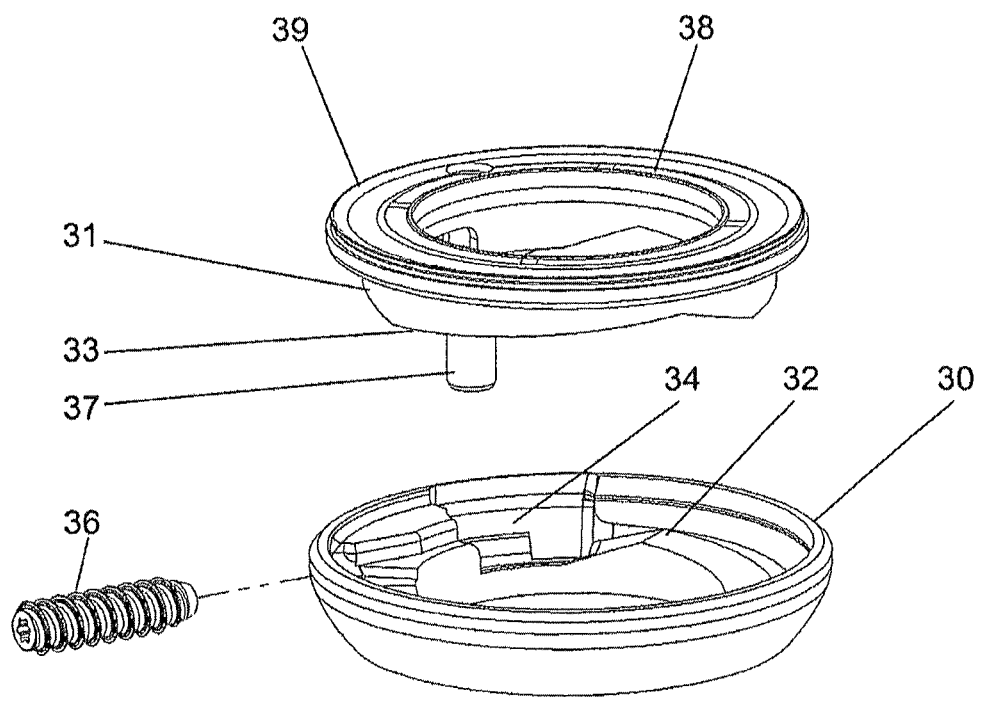
Figure 6:
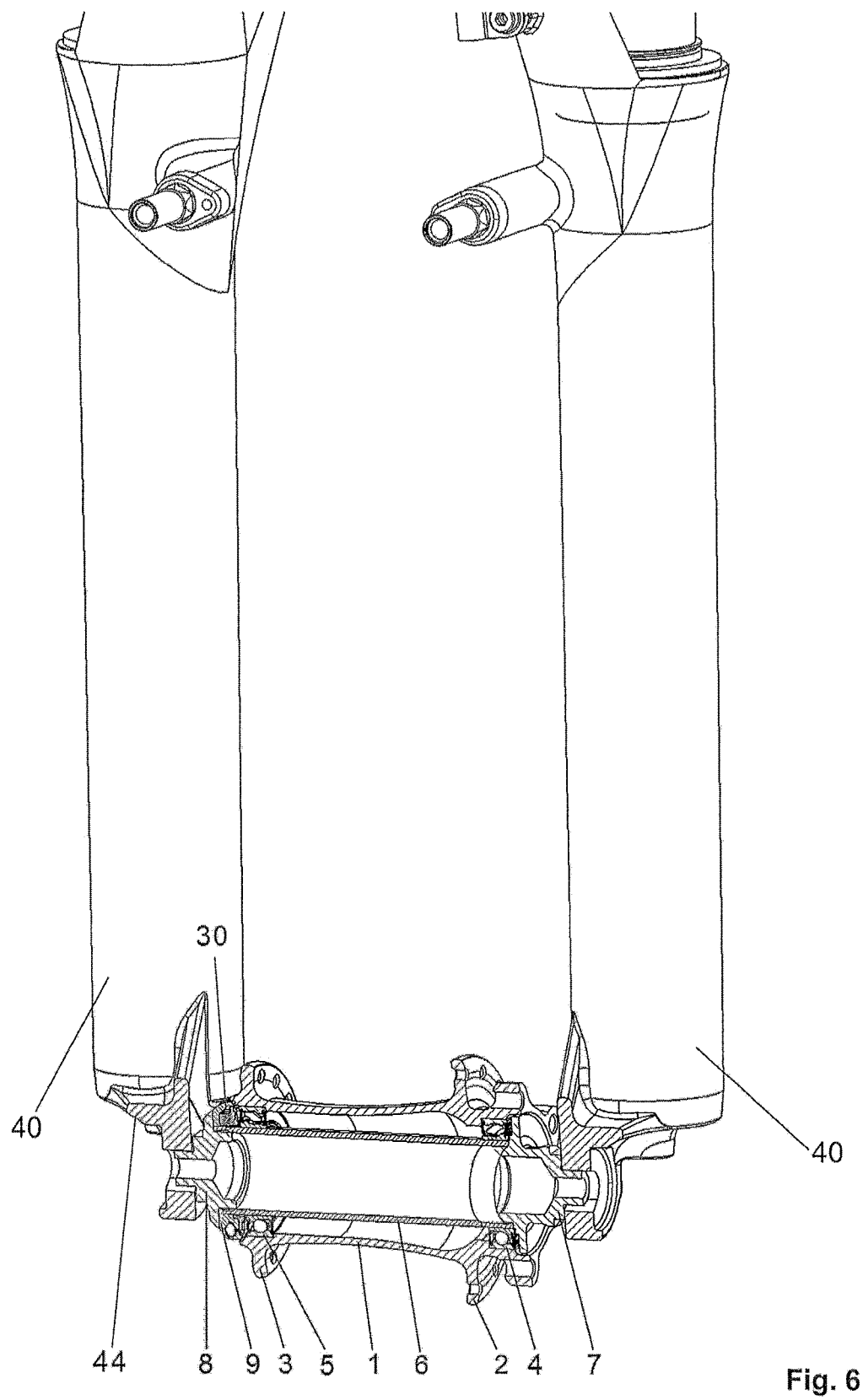
Figure 7:
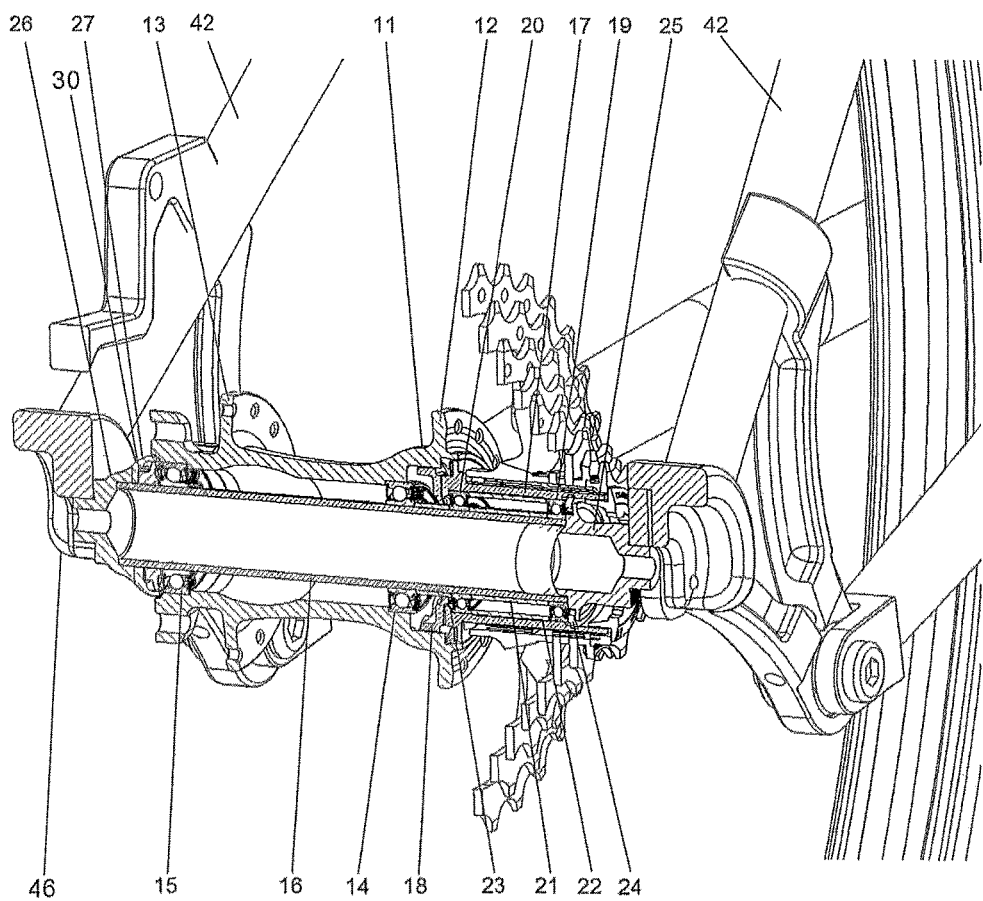

The apparatus according to the invention, for adjustment of axial bearing plays, is represented in the drawing using the example of the front wheel hub and rear wheel hub of a bicycle, and will be explained in greater detail below. The figures show:

FIG. 1 a front wheel hub of a bicycle in a spatial half-section with the apparatus according to the invention, for adjustment of axial bearing plays, installed, FIG. 2 the rear wheel hub of a bicycle in a spatial half-section with the apparatus according to the invention, for adjustment of axial bearing plays, installed, FIG. 3 the apparatus for adjustment of axial bearing plays in an exploded representation, with a view onto the screw ring that lies against the counter-bearing, FIG. 4 the apparatus assembled, as a spatial half-section, FIG. 5 the apparatus in an exploded view, with a view onto the pressure ring that lies against the roller bearing, FIG. 6 the shanks of a bicycle fork acting on the apparatus according to the invention, and FIG. 7 the shanks of a bicycle frame acting on the apparatus according to the invention.

DESCRIPTION OF THE EXEMPLARY EMBODIMENTS

FIG. 1 shows a front wheel hub of a bicycle, consisting of a hub body 1 and a right and left spoke flange 2, 3, viewed in the direction of travel, and a hollow axle 6 mounted in the hub body 1 by means of a right and a left ball bearing 4, 5. The ball bearing 4 is pressed into the hub body 1 with its outer ring, in the region of the right spoke flange 2, the left ball bearing 5 is pressed into the hub body 1 with its outer ring in a region that is guided out axially by way of the left spoke flange 3, while the hollow axle 6 is connected with the inner ring of each ball bearing 4, 5 by way of a sliding seat. The hollow axle 6 is provided with an end cap 7, 8 on both sides, wherein the right end cap 7 is screwed onto the hollow axle 6, the left end cap 8 is pressed onto or glued onto the hollow axle 6. The apparatus according to the invention for bearing play adjustment 9 is pushed onto the hollow axle 6 between the left end cap 8 and the left ball bearing 5.

FIG. 2 shows a rear wheel hub of a bicycle, consisting of a hub body 11 having a right and a left spoke flange 12, 13, viewed in the direction of travel, and a hollow axle 16 mounted in the hub body 11 by means of a right and a left ball bearing 14, 15. The right ball bearing 14 is pressed into the hub body 11 with its outer ring, in the region of the right spoke flange 12, the left ball bearing 15 is pressed into the hub body 11 with its outer ring, in a region that is guided out axially by way of the left spoke flange 13, while the hollow axle 16 is connected with the inner ring of each ball bearing 14, 15 by way of a sliding seat.

On the drive side, in other words on its right side, the hub body 11 is connected with a free-running body 17, in torque-proof manner, in an axial extension in one direction, wherein a lock washer 18 is disposed between their opposite face surfaces. The free-running body 17 is mounted on the hollow axle 16 by way of a right and a left free-running body bearing 19, 20, wherein the axle accommodates the two inner rings here, too, in the manner of a sliding seat. For this reason, the two free-running body bearings 19, 20 are secured, relative to one another, by means of an inner and an outer spacer sleeve 21, 22 axially relative to one another, and, secured axially in the hub body 11 by means of a further spacer sleeve 23 disposed between the left free-running body 20 and the right ball bearing 14 of the hub body 11. The right free-running body bearing 19 is axially secured by means of a clamping ring 24. The hollow axle 16 is provided with a right and a left end cap 25, 26 on both sides, wherein here, too, the right end cap 25 is screwed onto the hollow axle 16, the left one is pressed on or glued on.

The apparatus according to the invention for bearing play adjustment 27 is disposed between the left ball bearing 15 of the hub body 11 and the left end cap 26 in the case of the rear wheel axle, as well. The force flow between the two ball bearings 14, 15 is represented as a black free-hand line in FIG. 2, and provided with the reference number 28. It can be seen that for proper functioning of the bearing play adjustment apparatus 27, the spacer sleeve 23 disposed between the right ball bearing 14 and the left free-running body bearing 20, as well as the inner and outer spacer sleeves 21, 22 disposed between the right and left free-running bodies 19, 20 are required, in order to introduce the pressure force exerted by the bearing play adjustment apparatus 27 on the left ball bearing 15 into the right end cap 25, so that the bearing play present in the right ball bearing 14 is eliminated, as well.

Because the structure and the method of functioning of the two bearing play adjustment apparatuses 9, 27 are the same, they will be described together using FIGS. 3 to 5. They serve for simple manual adjustment of the respective bearing play that exists between the right and the left ball bearing 4, 5 of the front wheel hub and the right and the left ball bearing 14, 15 of the rear wheel hub, which play results from production and/or installation.

As can be seen in FIGS. 3 to 5, the bearing play adjustment apparatuses 9, 27 according to the invention consist of a screw ring 30 and a pressure ring 31, which are disposed coaxial to one another and have an inside diameter that makes it possible to easily push them onto the hollow axles 6 and 16. Their face surfaces, which face one another, have two wedge-shaped elevations 32, 33 that project out of their ring surface, in each instance, wherein the two wedge-shaped elevations 33 of the pressure ring 31 are disposed offset from the complementary wedge-shaped elevations 32 of the screw ring 30, so that the wedge-shaped elevations 32 of the screw ring 30 are accommodated by the complementary depressions of the pressure ring 31, and, vice versa, the wedge-shaped elevations 33 of the pressure ring 31 are accommodated by the complementary depressions of the screw ring 30. In this position, the bearing play adjustment apparatuses 9, 27 possess their smallest axial dimension (thickness), as they are also shown in FIGS. 1 and 2 in the state in which they are installed in the front wheel hub and the rear wheel hub, respectively. It is also remarkable that the screw ring 30 completely surrounds the pressure ring 31, up to its outer face side, with its mantle surface so that in the case of a relative movement between screw ring 30 and pressure ring 31, the surfaces of the wedge-shaped elevations 32, 33 that slide on one another when this happens are protected against contamination (FIG. 4).

As can be seen in FIG. 5, the ring space of the screw ring 30 is provided with a recess 34 that extends in arc shape, into which recess a bore 35 that proceeds from the outer circumference of the screw ring opens. If the screw ring 30 consists of a plastic, as in the present case, then the bore 35 does not need to be provided with a thread. Then the adjustment screw 36 has a self-tapping thread, which furthermore is also self-locking, so that the adjustment screw 36 cannot come loose on its own. When using harder materials for the screw ring 30, for example metals or ceramic, however, the bore 35 has to be configured as a threaded bore or have other suitable adjustment means that allow axial movement into the recess 34. In this case, securing of the adjustment screw 36 takes place using known means, for example a self-locking thread or a counter-nut.

Furthermore, it can be seen in FIGS. 3 and 5 that the pressure ring 31 has a pin 37 that extends out of the face surface in the axial direction, which pin projects into the recess 34 in the installed state of pressure ring 31 and screw ring 30.

From the view of the face side of the pressure ring 31 that lies against the left ball bearing 5, 15 of the front wheel hub or rear wheel hub, in each instance, shown in FIG. 5, as well as the half-section of the installed bearing play adjustment apparatuses 9, 27 shown in FIG. 4, an inner seal 38 injection-molded onto the inside diameter of the pressure ring 31 can be seen, which lies against the inner ring of the left ball bearing 5, 15, in each instance, in the installed state of the bearing play adjustment apparatuses 9, 27 (FIGS. 1 and 2). A lip seal 39 that is injection-molded on in this face side of the pressure ring 31 and extends all the way to its outside circumference seals the outer ring of the left ball bearings 5, 15 off, in each instance. The two seals 38, 39 already keep a major portion of the dirt that comes from the outside away from the left ball bearing 5, 15, so that the seal of the ball bearing 5, 15 only has to keep smaller dirt particles away from the bearing interior.

In the following, installation and functioning of the apparatus according to the invention for adjustment of axial bearing plays will be described in greater detail:

As can be seen in FIGS. 1 and 2 and has already been mentioned above, the bearing play adjustment apparatuses 9, 27 are disposed between a left end cap 8, 26 and the left ball bearing 5, 15 situated on the same side, in each instance, in such a manner that the pressure ring 31 lies against the inner ring of the ball bearing 5, 15, in each instance. In the case of ball bearings without an inner ring, the pressure ring 31 lies directly against the balls. For this purpose, its face surface has a track, for example in the form of a contact cone. Of course, it is also possible to dispose the bearing play adjustment apparatus 9 on the right side of the hubs, in each instance, but this is more difficult in the case of rear wheel hubs than in the case of front wheel hubs, because of the restricted construction space. In this case, the left end cap 8 is screwed onto the hollow axle 6, while the right end cap 7 is applied as a press seat or glued on. The following description of installation and functioning, however, relates only to the arrangement shown in the exemplary embodiments according to FIGS. 1 and 2, on the left side in the direction of travel.

First, the left end cap 8, 26 is glued onto the hollow axle 6, 16; afterward, the bearing play adjustment apparatus 9, 27 is pushed on and the assembly pre-assembled in this manner is pushed into the hub body 1, 11 completed with the ball bearings 4, 5, 14, 15. Finally, the right end cap 7, 25 is screwed on.

Afterward, the front wheel or rear wheel completed in this manner can be inserted into the fork 40 or the frame 42 and locked in place in the fork 40 or the frame 42 using quick-release mechanisms or other known means of attachment. In the finished, installed state of the wheels, the shanks 44 of the bicycle fork 40 or the shanks 46 of the bicycle frame 42 are pressed on the screw ring 30 by way of the left end cap 8, 26, so that these shanks 44, 46 serve as a counter-bearing for the screw ring 30. Finally, only the adjustment screw 36 on the screw ring 30 is still turned into the recess 34 to such an extent until it makes contact with the pin 37 of the pressure ring. As the adjustment screw 36 continues to be screwed in further, the pressure ring 31 moves about the hollow axle 6, 16, causing the wedge-shaped elevations 32, 33 to slide on one another and thereby to press the pressure ring, in the axial direction, against the inner ring of the left ball bearings 5, 15. In this way, the ball bearing 5, 15 is subjected to axial stress, and a force flow occurs between the track of the inner ring, the balls, and the track of the outer ring.

In the same manner, the balls of the ball bearing 4, 14 situated on the right side are pressed against the tracks of the outer ring of the right ball bearing 4, 14, by way of the force flow through the hub body 1, 11 toward the right end cap 7, 25 firmly screwed into the hollow axle 6, 16, so that the play in each ball bearing 4, 5, 14, 15 approaches zero. If the adjustment screw 36 continues to be turned, a defined preload, also referred to as negative play, can be adjusted within the ball bearings 4, 5, 14, 15.

The placement of the screw rings 30 and the pressure ring 31 can also be interchanged, i.e. the adjustment screw 36 is then situated in the ring that lies against the ball bearing 4, 5, 14, 15, while the ring that lies against the counter-bearing has the pin 37 that projects into the recess 34 of the screw ring 30.

All the characteristics represented here can be essential to the invention both individually and in any desired combination with one another.

REFERENCE SYMBOL LIST 1 hub body, front wheel
2 right spoke flange
3 left spoke flange
4 right ball bearing
6 hollow axle
7 right end cap
8 left end cap
9 bearing play adjustment, front wheel hub
11 hub body, rear wheel
12 right spoke flange
13 left spoke flange
14 right ball bearing
15 left ball bearing
16 hollow axle
17 free-running body
18 lock washer
19 right free-running body bearing
20 left free-running body bearing
21 inner spacer sleeve
22 outer spacer sleeve
23 spacer sleeve
24 clamping ring
25 right end cap
26 left end cap
27 bearing play adjustment, rear wheel hub
28 force flow line
30 screw ring
31 pressure ring
32 wedge-shaped elevation, screw ring
33 wedge-shaped elevation, pressure ring
34 recess
35 bore
36 adjustment screw
37 pin
38 inner seal
39 lip seal
40 fork
42 frame
44 shank of the fork
46 shank of the frame

The invention claimed is:

1. An apparatus for adjustment of bearing play of a first component and a second component mounted so as to rotate coaxially relative to one another by way of a first roller bearing and a second roller bearing disposed at an axial distance from one another, wherein the first component is accommodated by a cap, the apparatus comprising:
(a) a first ring and a second ring disposed next to one another, coaxially, on the first component connected with the cap, wherein the first ring has a first inner face surface extending in a first plane and comprising a first contour projecting out of the first plane of the first inner face surface and the second ring has a second inner face surface facing the first inner face surface and extending in a second plane, the second inner face surface comprising a second contour projecting out of the second plane of the second inner face surface, wherein the first contour comprises an incline and the second contour slides on the incline,
(b) a pin projecting axially out of at least one of the first and second rings into a circumferentially extending recess of the other of the first and second rings, and
(c) an adjustment element projecting into the recess, wherein the adjustment element is movable and lockable against the pin,
wherein the first ring has a first outer face surface and the second ring has a second outer face surface, wherein at least one of the first and second outer face surfaces is disposed on the first component connected with the cap, in an axially movable manner, in an installed state, and lies against the cap of the first component, wherein the cap forms a counter-bearing, and the other of the first and second outer face surfaces stands in interaction coaxially with the first roller bearing and exerts an axial pressure on the second roller bearing; and
wherein the second ring stands in interaction with the first roller bearing and has an inner seal on an inner circumference of the second outer face surface and an outer seal on an outer circumference of the second outer face surface.

2. The apparatus according to claim 1, wherein the second ring stands in interaction with the first roller bearing and has the pin and the first ring has the recess and the adjustment element.

3. The apparatus according to claim 2, wherein the adjustment element is an adjustment screw.

4. The apparatus according to claim 1, wherein the first ring comprises a polymer material.

5. The apparatus according to claim 3, wherein the adjustment screw has a self-locking thread.

6. The apparatus according to claim 1, wherein the inner seal and the outer seal are laid into or injection-molded on the second ring.

7. An arrangement comprising:
(a) an axle;
(b) a hub body of a bicycle rotatably mounted on the axle by a first roller bearing and a second roller bearing disposed in the hub body at an axial distance from one another, the bicycle comprising a fork or a frame, the axle being clamped in the fork or the frame; and (c) a bearing play adjustment apparatus disposed between one of the first and second roller bearings and a shank of the fork or the frame, the bearing play adjustment apparatus exerting an axial pressure on one of the first and second roller bearings;

wherein the bearing play adjustment apparatus comprises an axially movable first ring and an axially movable second ring disposed next to one another coaxially on the axle;

wherein the first ring has an inner face surface extending in a first plane and comprising a first contour projecting out of the first plane of the first inner face and the second ring has a second inner face surface facing the first inner face surface and extending in a second plane, the second inner face surface comprising a second contour projecting out of the second plane of the second inner face surface;

wherein the first contour comprises an incline and the second contour slides on the incline;

wherein the first ring has a first outer face surface and the second ring has a second outer face surface, the first outer face surface standing in interaction with the fork or the frame of the bicycle and the second outer face of the second ring standing in interaction with the first roller bearing;

wherein each of the first and the second rings is movable axially and lockable in a selected axial position; and wherein the first ring stands in interaction with the fork or the frame of the bicycle with the first outer face surface, by way of an end cap disposed on the axle.

8. The apparatus according to claim 7, wherein the second ring has a pin that projects axially out of the second inner face surface, and the first ring has a circumferentially extending recess wherein the pin projects into the recess, wherein an adjustment element projects into the recess, wherein the adjustment element is movable and lockable against the pin.

9. The arrangement according to claim 7, wherein the second ring stands in interaction with the first roller bearing and has an inner seal on an inside circumference of the second outer surface that lies against the first roller bearing and an outer seal on an outer circumference of the second outer surface.

\* \* \* \* \*